Patented Sept. 2, 1952

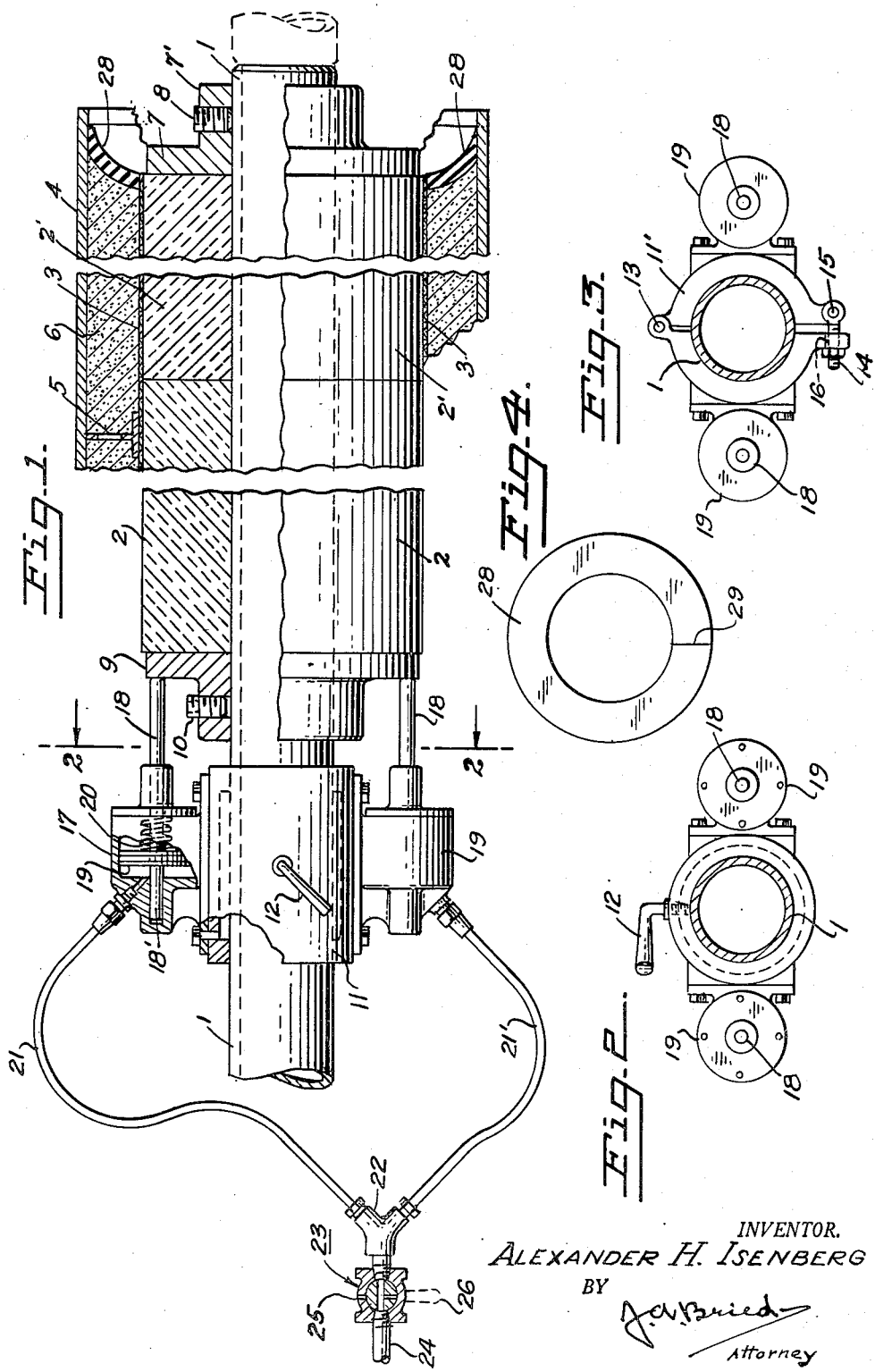

2,608,754

UNITED STATES PATENT OFFICE 2,608,754

APPARATUS FOR MAKING THERMAL INSULATED PIPE

Alexander H. Isenberg, Woodside, Calif.

Application August 9, 1946, Serial No. 689,539

3 Claims. (Cl. 29—238)

This invention relates to the making of thermal insulated pipe particularly of the type wherein a length of metal pipe is enclosed in preformed thermal insulating sections, the sections secured in tightly abutting relation and surrounded with a thick layer of solid pitch cast in place, in turn enclosed in a sheet metal outer casing.

The object of the invention is to provide a method and means for effecting a better and quicker assembly of the parts in making such insulated pipe.

Particular features and advantages of the invention will appear in the following description and accompanying drawings.

In the drawings:

Fig. 1 is a side view partly in section, showing such an insulated pipe, broken in length, and progressively completed from the left to the right-hand end.

Fig. 2 is a cross section of Fig. 1 taken along the line 2—2 thereof.

Fig. 3 is a similar cross section to that of Fig. 2 but showing a modification in the means for clamping the insulation pusher to the pipe.

Fig. 4 is a reduced size plan view of the soft rubber ring used as an end stop for the molten asphalt as it is introduced.

To give a better understanding of the detailed description to follow, it may be said that in making such an assemblage before the present invention, a desired length of pipe had applied over it a series of preformed tubular sections 2, 2' of heat insulation, composed of any suitable material, though preferably consisting of the well known magnesia steam pipe insulating sections readily obtainable in all sizes in tubular and split or half tubular sections.

These sections were slipped over the pipe, or if split were applied from opposite sides, moved up as close as possible, and secured in place as by spirally wrapping about them with one or more layers of cloth or canvas 3 held in place by any suitable adhesive.

After this has been done, the covered pipe should be placed within a much larger sheet metal casing 4 and spacedly centered therein as by the use of suitable spacing spiders 5 which have previously been applied circumferentially of the insulation at intervals over the length of the insulated tube, whereupon fluid molten asphalt pitch 6 or similar waterproofing compound is then poured into the outer casing to fill the space and is permitted to set in situ to form a solid water seal for substantially the length of the insulated portion of the pipe. The fluid molten pitch which hardens at normal temperature is poured into the outer casing either through one open end of the casing and with the other end plugged, or through holes in the casing with both ends plugged, the molten pitch being permitted to flow between the casing and the insulation and harden in situ. Since the spacer members 5 are spiders, they have a web portion perpendicular to the axis of the enclosed pipe and insulation, and the perpendicular web is provided with an opening therethrough so that the fluid pitch may flow longitudinally through said opening as well as flowing circumferentially between the outer casing and the body of insulation which encloses the conduit pipe therein.

In the making of the assembly as explained it was difficult to get a tight juncture of the insulation sections to prevent heat radiation and loss, and one of the objects of the present invention is to overcome this difficulty.

In the present method of making up the assembly, a disk flange or collar 7 is secured adjacent one end of the pipe 1 as by one or more set screws 8 passing through the hub 7' of the flange and impinging the pipe. This flange is preferably a trifle smaller than the outer diameter of the insulation sections 2 as indicated.

The insulation sections are all pushed up in direction of the fixed flange 7 by hand or hammer and a second flange 9, similar to the first one 7, is placed on the pipe and its set screw 10 tightened lightly against the pipe, and after which a hollow carrier 11 is slipped over the end of the pipe and securely clamped to the pipe as by means of a lever handle screw 12 or otherwise, or if the carriage is of the split type 11' shown in Fig. 3 wherein its two halves are pivoted together as at 13 it is engaged over the pipe by opening the halves and clamping them together upon the pipe as by bolts 14 pivoted to one of the halves as at 15 and passing into open slots 16 formed in the other half as indicated.

On this carriage are mounted two or more fluid operated power pistons the cylinders of which are indicated at 17 and the piston rods at 18. The carrier is clamped to the pipe with the retracted piston rods in contact with flange 9, the piston rods being at opposite points if there are two, or equally spaced around the flange if more.

In the drawing pistons 19 are shown automatically retracted by coil springs 20, and also provided with rearwardly extending piston rods 18' to function as a stop to preserve starting clearance within the cylinders.

The showing of the automatically retracting pressure pistons implies no limitations as it is only made for illustrative purposes, as it is manifest the plunger rods or piston rods 18 may be of the diaphragm or bellows operated type, as commonly used on motor truck brakes and general industrial purposes.

The cylinders are connected to a source of fluid pressure, preferably compressed air, by means of hoses 21, 21' and a Y fitting 22 and through a control valve 23 at the end of a supply pipe or hose 24. The valve is provided with a pressure relief opening 25 to bleed the cylinders when the pressure is turned off by swinging the handle 26 from "in line" position to the right angle dotted position, the valve being shown in cross section with the pressure open to the cylinders.

Before turning on the pressure, set screw 10 is released, and when the pressure is applied the pistons will at once powerfully force the flange 9, and the insulation sections along the pipe into close end contact to any degree desired. The set screw 10 may again be tightened to hold all of the insulation sections in tight contact and valve 3 turned off and the pressure apparatus removed if desired, or the pressure may be maintained while the canvas wrappings 3 are adhesively secured around the insulation section 2, and the pressure later removed. If split sections of insulation are used each pair may be drawn tightly together by the usual straps used for the purpose, before the end contact forcing apparatus is applied.

After the assemblage is completely wrapped with the cloth or other wrapping 3 (or even without such wrapping) the assembly is fitted with a number of suitable spacing spiders, as at 5 and inserted in the sheet metal outer shell or casing 4. Instead of the spacers 5 being applied over the assemblage they sometimes are formed integral with short sections of the insulation 2 as well known, and not affecting the present invention as described.

After inserting the assemblage into the casing the molten (normally solid) pitch or asphalt 6 is poured in as explained. If the wrappings 3 have been used and the insulation sections satisfactorily locked thereby in tight end contact, the flanges 7 and 9 may be removed before placing the assemblage into the casing, but it is better to leave the flanges in place until after the pitch has hardened which aids in locking the insulation sections against endwise separation.

It is understood in the art, that the insulation sections are not in any way adherent to the pipe 1 itself as the pipe must at all times be able to expand and contract linearly due to the extreme variations in temperature to which it may be subjected by the nature of the fluid, either hot or cold, which it may be used for.

Before casting the molten pitch into the casing space, one or both ends must be plugged, and since in regular installations several, or a great many, pipe lengths assembled as described, are joined at their ends, as by welding the extending ends of the bare inner pipe 1, and thereafter locally covering the joint with insulation pitch, and a short section of casing to make the thermal insulation, and moisture insulation (pitch) and casing continuous, it is desirable to stop the pitch at a point somewhat within the outer ends of the insulation section 2, a matter which has heretofore been troublesome to accomplish in the manner best suited to the later completion of the joints.

This difficulty has been overcome by the use of a very soft and thick rubber (natural or synthetic) ring 28 shown in Fig. 4. This ring may be split as at 29 if desired, to permit removal after the pipe joints have been welded, though generally it is a whole ring and is removed before welding two lengths of pipe together. The ring is preferably somewhat larger in outside diameter than the inside of the casing 4 and a snug fit upon the outer circumference of the insulation (and wrapping 3 if used), so that when the ring is pushed into place as indicated in Fig. 1 it will be deformed as shown, and thereby form a concavely shaped end to the cast pitch, and thereby make a better joint with the pitch used at the joint, and also preserve a bare end margin around the insulation 2 for joining with the wrappings of the joint insulation. Because of the rubber ring being thick (about ½ inch is found satisfactory) and very soft, it readily conforms to the somewhat uneven surface of the insulation 2 or wrappings 3, and also to the seldom perfectly round interior of the casing 4. Before inserting the rubber ring it is preferably coated with a layer of siliceous or white wash, to prevent sticking to the pitch.

By the apparatus and method of handling above set out, the production of such thermally insulated pipe is greatly facilitated and a more efficient product secured than heretofore possible under the conditions obtaining in the commercial making and installing of such piping.

I claim:

1. In apparatus for the manufacture of thermally insulated pipe enclosed within a plurality of longitudinal sections of preformed thermal insulation in end-to-end abutting relation and in turn enclosed in spaced relation within an outer casing with a pourable pitch layer therebetween, means to compact the sections of insulation relatively longitudinally of the pipe, comprising a disc plate releasably mounted on the pipe at each of the opposite terminal ends of the plurality of insulation sections, said disc plates each having a releasable clamp whereby the plates may be selectively fixed and released relative to the pipe, a carrier mounted around substantially the entire circumference of the pipe, adjacently beyond one of the disc plates, a plurality of fluid operated cylinders and plungers mounted on said carrier, the plungers being disposed longitudinally of the pipe and relatively spaced circumferentially of the carrier, the free end of said plungers being adapted for contacting said one adjacent disc plate, means for releasably locking the carrier to the pipe, fluid pressure valve control means common to all of said plungers for operating the plungers into pressure contact with said disc plate at said adjacent end of the insulation sections to force the insulation sections into longitudinal relative end-to-end contact, said valve means being provided with a bleeder port from the cylinders whereby residual pressure in the cylinders may be exhausted to release the pressure of said plungers against said adjacent disc plate.

2. A structure having the elements of claim 1 and in which there is provided means rendering said plungers automatically retractable when the fluid pressure is released.

3. A structure having the elements of claim 1 and in which said carrier comprises a hollow body having hingedly connected sections clamped circumferentially about the pipe.

ALEXANDER H. ISENBERG.

REFERENCES CITED

The following references are of record in the file of this patent:

UNITED STATES PATENTS

| Number | Name | Date |
|---|---|---|
| 639,620 | Schilling | Dec. 19, 1899 |
| 1,105,590 | Abbott | July 28, 1914 |
| 1,709,844 | Durant | Apr. 23, 1929 |
| 1,894,835 | Smith et al. | Jan. 17, 1933 |
| 2,238,424 | McQuade | Apr. 15, 1941 |
| 2,387,190 | Stone et al. | Oct. 16, 1945 |

FOREIGN PATENTS

| Number | Country | Date |
|---|---|---|
| 22,723 | Great Britain | of 1906 |